United States Patent
Chiera et al.

(10) Patent No.: US 9,840,963 B2
(45) Date of Patent: Dec. 12, 2017

(54) PARALLEL PRECHAMBER IGNITION SYSTEM

(71) Applicant: Woodward, Inc., Fort Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/074,937

(22) Filed: Mar. 18, 2016

(65) Prior Publication Data
US 2016/0273443 A1    Sep. 22, 2016

Related U.S. Application Data

(60) Provisional application No. 62/136,171, filed on Mar. 20, 2015.

(51) Int. Cl.
*F02B 19/18* (2006.01)
*F02B 19/12* (2006.01)
(Continued)

(52) U.S. Cl.
CPC .......... *F02B 19/18* (2013.01); *F02B 19/1071* (2013.01); *F02B 19/1095* (2013.01);
(Continued)

(58) Field of Classification Search
CPC .. F02B 19/18; F02B 19/1071; F02B 19/1095; F02B 19/12
(Continued)

(56) References Cited

U.S. PATENT DOCUMENTS

| 892,296 A | 6/1908 | Oberhansli |
| 1,009,867 A | 11/1911 | Terry |

(Continued)

FOREIGN PATENT DOCUMENTS

| AT | 410007 | 1/2003 |
| AT | 509876 | 12/2011 |

(Continued)

OTHER PUBLICATIONS

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).

(Continued)

*Primary Examiner* — Mahmoud Gimie
(74) *Attorney, Agent, or Firm* — Fish & Richardson P.C.

(57) ABSTRACT

An air/fuel mixture is ignited in an internal combustion engine by receiving the air/fuel mixture as an incoming air/fuel mixture flow from a main combustion chamber of the internal combustion engine into an enclosure adjacent the main combustion chamber. The enclosure defines a first chamber enclosing first and second ignition bodies and the enclosure defines a second chamber adjacent the first chamber and connected to the first chamber via a passage. A portion of the air/fuel mixture received in the enclosure is directed toward an ignition gap between the first and second ignition bodies and another portion is directed into the second chamber. The air/fuel mixture is then ignited in the ignition gap, and flame from combustion in the first chamber is ejected into the main combustion chamber. Then, flame from combustion in the second chamber is ejected into the main combustion chamber.

18 Claims, 4 Drawing Sheets

(51) Int. Cl.
*F02B 19/10* (2006.01)
*F02B 43/04* (2006.01)
*F02B 43/10* (2006.01)
*F02P 13/00* (2006.01)

(52) U.S. Cl.
CPC .............. *F02B 19/12* (2013.01); *F02B 43/04* (2013.01); *F02B 2043/103* (2013.01); *F02P 13/00* (2013.01); *Y02T 10/125* (2013.01); *Y02T 10/32* (2013.01)

(58) Field of Classification Search
USPC ................ 123/268, 260, 256, 262, 263, 291
See application file for complete search history.

(56) References Cited

U.S. PATENT DOCUMENTS

| | | |
|---|---|---|
| 1,242,375 A | 10/1917 | Robinson |
| 1,253,570 A | 1/1918 | Berry |
| 1,320,115 A | 10/1919 | Bloomhuff et al. |
| 1,322,493 A | 11/1919 | Little |
| 1,325,439 A | 12/1919 | Dinger |
| 1,360,294 A | 11/1920 | Hill |
| 1,361,347 A | 12/1920 | Nighswander |
| 1,361,580 A | 12/1920 | Herz |
| 1,538,750 A | 5/1925 | Scognamillo |
| 1,594,773 A | 8/1926 | French |
| 1,596,240 A | 8/1926 | Dikeman |
| 1,611,856 A | 12/1926 | Farnsworth |
| 1,700,603 A | 1/1929 | Vreeland et al. |
| 1,732,827 A | 10/1929 | Adam |
| 1,748,338 A | 2/1930 | Georgias |
| 1,963,801 A | 6/1934 | O'Marra |
| 2,047,575 A | 7/1936 | Burtnett |
| 2,127,513 A | 8/1938 | Harper, Jr. |
| 2,153,598 A | 4/1939 | Steward |
| 2,208,030 A | 7/1940 | Holmes |
| 2,231,173 A | 2/1941 | Starr |
| 2,299,924 A | 10/1942 | Ost |
| 2,314,128 A | 3/1943 | Coldwell |
| 2,416,107 A | 2/1947 | Litton |
| 2,456,080 A | 12/1948 | Wu Pe |
| 2,487,535 A | 11/1949 | Fernandez |
| 2,497,862 A | 2/1950 | Chuy |
| 2,509,538 A | 5/1950 | Sues |
| 2,586,864 A | 2/1952 | Rose |
| 2,614,546 A | 10/1952 | Schwarz |
| 2,673,554 A | 3/1954 | Thaheld |
| 2,758,576 A | 8/1956 | Schlamann |
| 2,776,394 A | 1/1957 | Cuny et al. |
| 2,843,780 A | 7/1958 | Harper, Jr. |
| 2,895,069 A | 7/1959 | Davis |
| 2,899,585 A | 8/1959 | Dollenberg |
| 2,957,099 A | 10/1960 | Dutterer |
| 3,230,939 A | 1/1966 | Abramovich |
| 3,270,722 A | 9/1966 | Springer |
| 3,300,672 A | 1/1967 | Fisher |
| 3,665,902 A | 5/1972 | Bloomfield |
| 3,710,764 A | 1/1973 | Jozlin |
| 3,718,425 A | 2/1973 | Weyl et al. |
| 3,911,874 A | 10/1975 | Vincent |
| 3,911,878 A | 10/1975 | Hofbauer et al. |
| 3,958,144 A | 5/1976 | Franks |
| 4,004,413 A | 1/1977 | Ueno |
| 4,091,772 A | 5/1978 | Heater |
| 4,092,558 A | 5/1978 | Yamada |
| 4,096,832 A | 6/1978 | Casull |
| 4,098,232 A | 7/1978 | Gleiter |
| 4,123,998 A | 11/1978 | Heintzelman |
| 4,124,000 A | 11/1978 | Genslak |
| 4,125,094 A | 11/1978 | Noguchi et al. |
| 4,143,627 A * | 3/1979 | Noguchi ............. F02B 19/1066 123/274 |
| 4,170,968 A * | 10/1979 | Noguchi ................. F02B 19/12 123/260 |
| 4,218,993 A | 8/1980 | Blackburn |
| 4,232,638 A | 11/1980 | Takahashi |
| 4,242,990 A * | 1/1981 | Scherenberg ........... F02B 19/12 123/169 PA |
| 4,248,189 A | 2/1981 | Barber et al. |
| 4,248,192 A | 2/1981 | Lampard |
| 4,372,264 A | 2/1983 | Trucco |
| 4,398,513 A | 8/1983 | Tanasawa |
| 4,406,260 A | 9/1983 | Burley |
| 4,416,228 A | 11/1983 | Benedikt et al. |
| 4,424,780 A | 1/1984 | Trucco |
| 4,429,669 A | 2/1984 | Burley |
| 4,441,469 A | 4/1984 | Wilke |
| 4,452,189 A | 6/1984 | Latsch et al. |
| 4,490,122 A | 12/1984 | Tromeur |
| 4,509,476 A | 4/1985 | Breuser et al. |
| 4,532,899 A | 8/1985 | Lorts |
| 4,612,888 A | 9/1986 | Ishida |
| 4,641,616 A | 2/1987 | Lampard |
| 4,646,695 A | 3/1987 | Blackburn |
| 4,744,341 A | 5/1988 | Hareyama et al. |
| 4,765,293 A | 8/1988 | Gonzalez |
| 4,795,937 A | 1/1989 | Wagner et al. |
| 4,854,281 A | 8/1989 | Hareyama et al. |
| 4,901,688 A | 2/1990 | Kashiwara et al. |
| 4,930,473 A | 6/1990 | Dietrich |
| 4,963,784 A | 10/1990 | Niessner |
| 4,987,868 A | 1/1991 | Richardson |
| 5,014,656 A | 5/1991 | Leptich et al. |
| 5,051,651 A | 9/1991 | Kashiwara et al. |
| 5,067,458 A | 11/1991 | Bailey |
| 5,076,229 A | 12/1991 | Stanley |
| 5,085,189 A | 2/1992 | Huang |
| 5,091,672 A | 2/1992 | Below |
| 5,105,780 A | 4/1992 | Richardson |
| 5,107,168 A | 4/1992 | Friedrich et al. |
| 5,222,993 A | 6/1993 | Crane |
| 5,224,450 A | 7/1993 | Paul et al. |
| 5,239,959 A | 8/1993 | Loth et al. |
| 5,245,963 A | 9/1993 | Sabol et al. |
| 5,271,365 A | 12/1993 | Oppenheim |
| 5,369,328 A | 11/1994 | Gruber et al. |
| 5,408,961 A | 4/1995 | Smith |
| 5,421,300 A | 6/1995 | Durling et al. |
| 5,430,346 A | 7/1995 | Johnson |
| 5,454,356 A | 10/1995 | Kawamura |
| 5,554,908 A | 9/1996 | Kuhnert et al. |
| 5,555,862 A | 9/1996 | Tozzi |
| 5,555,867 A | 9/1996 | Freen |
| 5,555,868 A | 9/1996 | Neumann |
| 5,560,326 A | 10/1996 | Merritt |
| 5,612,586 A | 3/1997 | Benedikt et al. |
| 5,619,959 A | 4/1997 | Tozzi |
| 5,623,179 A | 4/1997 | Buhl |
| 5,632,253 A | 5/1997 | Paul et al. |
| 5,647,444 A | 7/1997 | Williams |
| 5,662,181 A | 9/1997 | Williams et al. |
| 5,678,517 A | 10/1997 | Chen et al. |
| 5,715,788 A | 2/1998 | Tarr |
| 5,791,374 A | 8/1998 | Black et al. |
| 5,799,637 A | 9/1998 | Cifuni |
| 5,803,026 A | 9/1998 | Merritt |
| 5,821,675 A | 10/1998 | Suzuki |
| 5,829,407 A | 11/1998 | Watson |
| 5,892,319 A | 4/1999 | Rossi |
| 5,947,076 A | 9/1999 | Srinivasan et al. |
| 6,013,973 A | 1/2000 | Sato |
| 6,060,822 A | 5/2000 | Krupa et al. |
| 6,064,144 A | 5/2000 | Knoll et al. |
| 6,095,111 A | 8/2000 | Ueda |
| 6,129,069 A | 10/2000 | Uitenbroek |
| 6,129,152 A | 10/2000 | Hosie et al. |
| 6,130,498 A | 10/2000 | Shimizu et al. |
| 6,198,209 B1 | 3/2001 | Baldwin et al. |
| 6,279,550 B1 | 8/2001 | Bryant |
| 6,326,719 B1 | 12/2001 | Boehler et al. |
| 6,460,506 B1 | 10/2002 | Nevinger |
| 6,463,890 B1 | 10/2002 | Chomiak |
| 6,495,948 B1 | 12/2002 | Garrett, III |

(56) References Cited

U.S. PATENT DOCUMENTS

| | | | |
|---|---|---|---|
| 6,554,016 B2 | 4/2003 | Kinder | |
| 6,574,961 B2 | 6/2003 | Shiraishi | |
| 6,595,182 B2 | 7/2003 | Oprea | |
| 6,611,083 B2 | 8/2003 | LaBarge et al. | |
| 6,670,740 B2 | 12/2003 | Landon, Jr. | |
| 6,749,172 B2 | 6/2004 | Kinder | |
| 6,830,017 B2 | 12/2004 | Wolf et al. | |
| 6,913,092 B2 | 7/2005 | Bourgoyne et al. | |
| 7,004,444 B2 | 2/2006 | Kinder | |
| 7,007,661 B2 | 3/2006 | Warlick | |
| 7,007,913 B2 | 3/2006 | Kinder | |
| 7,086,376 B2 | 8/2006 | McKay | |
| 7,100,567 B1 | 9/2006 | Bailey et al. | |
| 7,104,245 B2 | 9/2006 | Robinet et al. | |
| 7,370,626 B2 | 5/2008 | Schubert | |
| 7,409,933 B2 | 8/2008 | Nino | |
| 7,438,043 B2 | 10/2008 | Shiraishi | |
| 7,615,914 B2 | 11/2009 | Francesconi et al. | |
| 7,628,130 B2 | 12/2009 | Johng | |
| 7,659,655 B2 | 2/2010 | Tozzi et al. | |
| 7,743,753 B2 | 6/2010 | Fiveland | |
| 7,762,320 B2 | 7/2010 | Williams | |
| 7,848,871 B2 | 12/2010 | Onishi | |
| 7,856,956 B2 | 12/2010 | Inoue et al. | |
| 7,891,426 B2 | 2/2011 | Williams | |
| 7,922,551 B2 | 4/2011 | Tozzi | |
| 7,950,364 B2 | 5/2011 | Nerheim | |
| 8,033,335 B2 | 10/2011 | Orbell et al. | |
| 8,143,772 B2 | 3/2012 | Francesconi | |
| 8,181,617 B2 | 5/2012 | Kuhnert et al. | |
| 8,261,711 B2 | 9/2012 | Shimoda | |
| 8,286,734 B2 | 10/2012 | Hannegan et al. | |
| 8,313,324 B2 | 11/2012 | Bulat et al. | |
| 8,322,432 B2 | 12/2012 | Bailey et al. | |
| 8,353,337 B2 | 1/2013 | Bailey et al. | |
| 8,387,587 B2 | 3/2013 | Ogata | |
| 8,499,854 B2 | 8/2013 | Mitchell et al. | |
| 8,584,648 B2 | 11/2013 | Chiera et al. | |
| 8,733,331 B2 | 5/2014 | McAlister | |
| 8,757,129 B1 | 6/2014 | Hill | |
| 8,800,536 B2 | 8/2014 | Plata | |
| 8,839,762 B1 | 9/2014 | Chiera et al. | |
| 8,857,405 B2 | 10/2014 | Attard | |
| 8,890,396 B2 | 11/2014 | Ernst | |
| 8,924,136 B2 | 12/2014 | Nakamoto | |
| 8,925,518 B1 | 1/2015 | Riley | |
| 9,172,216 B2 | 10/2015 | Ernst | |
| 2003/0196634 A1 | 10/2003 | Lausch | |
| 2004/0061421 A1 | 4/2004 | Morita et al. | |
| 2004/0100179 A1 | 5/2004 | Boley et al. | |
| 2004/0123849 A1 | 7/2004 | Bryant | |
| 2004/0177837 A1 | 9/2004 | Bryant | |
| 2005/0000484 A1 | 1/2005 | Schultz et al. | |
| 2005/0092285 A1 | 5/2005 | Klonis et al. | |
| 2005/0172929 A1 | 8/2005 | Strauss | |
| 2005/0211217 A1 | 9/2005 | Boley et al. | |
| 2005/0224606 A1 | 10/2005 | Dingle | |
| 2005/0279321 A1 | 12/2005 | Crawford | |
| 2006/0005803 A1 | 1/2006 | Robinet et al. | |
| 2006/0278195 A1 | 12/2006 | Hotta | |
| 2007/0069617 A1 | 3/2007 | Tozzi et al. | |
| 2007/0151540 A1 | 7/2007 | Takahashi et al. | |
| 2007/0169737 A1 | 7/2007 | Gong et al. | |
| 2007/0236122 A1 | 10/2007 | Borror | |
| 2007/0261672 A1 | 11/2007 | Lippert | |
| 2008/0017165 A1 | 1/2008 | Schubert | |
| 2008/0168963 A1 | 7/2008 | Gagliano | |
| 2008/0257301 A1 | 10/2008 | Hotta | |
| 2009/0236144 A1 | 9/2009 | Todd et al. | |
| 2009/0241896 A1 | 10/2009 | Fiveland | |
| 2009/0309475 A1 | 12/2009 | Tozzi | |
| 2010/0132660 A1 | 6/2010 | Nerheim | |
| 2010/0133977 A1 | 6/2010 | Kato | |
| 2010/0192909 A1 | 8/2010 | Ikeda | |
| 2011/0036638 A1 | 2/2011 | Sokol et al. | |
| 2011/0062850 A1 | 3/2011 | Tozzi | |
| 2011/0065350 A1 | 3/2011 | Burke | |
| 2011/0089803 A1 | 4/2011 | Francesconi | |
| 2011/0148274 A1 | 6/2011 | Ernst | |
| 2011/0297121 A1 | 12/2011 | Kraus et al. | |
| 2011/0308489 A1 | 12/2011 | Herden | |
| 2011/0320108 A1 | 12/2011 | Morinaga | |
| 2012/0000664 A1 | 1/2012 | Nas et al. | |
| 2012/0013133 A1 | 1/2012 | Rios, III et al. | |
| 2012/0064465 A1 | 3/2012 | Borissov et al. | |
| 2012/0103302 A1 | 5/2012 | Attard | |
| 2012/0118262 A1 | 5/2012 | Johnson | |
| 2012/0125279 A1 | 5/2012 | Hampson et al. | |
| 2012/0125287 A1* | 5/2012 | Chiera | F02B 19/12 123/254 |
| 2012/0125636 A1 | 5/2012 | Linde et al. | |
| 2012/0299459 A1 | 11/2012 | Sakakura | |
| 2012/0310510 A1 | 12/2012 | Imamura | |
| 2013/0000598 A1 | 1/2013 | Tokuoka | |
| 2013/0042834 A9 | 2/2013 | Chiera et al. | |
| 2013/0047954 A1 | 2/2013 | McAlister | |
| 2013/0055986 A1 | 3/2013 | Tozzi et al. | |
| 2013/0099653 A1* | 4/2013 | Ernst | H01T 13/32 313/140 |
| 2013/0139784 A1 | 6/2013 | Pierz | |
| 2013/0160734 A1 | 6/2013 | Redtenbacher et al. | |
| 2013/0179050 A1 | 7/2013 | Munshi | |
| 2013/0192896 A1 | 8/2013 | Bailey et al. | |
| 2013/0220269 A1 | 8/2013 | Woo et al. | |
| 2014/0026846 A1 | 1/2014 | Johnson | |
| 2014/0032081 A1 | 1/2014 | Willi et al. | |
| 2014/0076274 A1 | 3/2014 | Tozzi et al. | |
| 2014/0083391 A1 | 3/2014 | Gruber | |
| 2014/0102404 A1 | 4/2014 | Sotiropoulou et al. | |
| 2014/0137840 A1 | 5/2014 | McAlister | |
| 2014/0144406 A1 | 5/2014 | Schock | |
| 2014/0165980 A1 | 6/2014 | Chiera et al. | |
| 2014/0190437 A1 | 7/2014 | Chiera et al. | |
| 2014/0209057 A1 | 7/2014 | Pouring | |
| 2014/0261294 A1 | 9/2014 | Thomassin | |
| 2015/0020769 A1 | 1/2015 | Huang | |
| 2015/0040845 A1 | 2/2015 | Chiera et al. | |
| 2015/0068489 A1 | 3/2015 | Bunce | |
| 2015/0075506 A1 | 3/2015 | Ishida | |
| 2015/0128898 A1 | 5/2015 | Osaka | |
| 2015/0167576 A1 | 6/2015 | Glugla et al. | |
| 2015/0260131 A1 | 9/2015 | Riley | |
| 2015/0267631 A1 | 9/2015 | Miyamoto | |
| 2015/0354481 A1 | 12/2015 | Geckler | |
| 2016/0010538 A1 | 1/2016 | Suzuki | |
| 2016/0017845 A1 | 1/2016 | Huang | |
| 2016/0024994 A1 | 1/2016 | Engineer | |
| 2016/0047323 A1 | 2/2016 | Suzuki | |
| 2016/0053668 A1 | 2/2016 | Loetz | |

FOREIGN PATENT DOCUMENTS

| | | |
|---|---|---|
| CA | 1010329 | 5/1977 |
| CA | 2320415 | 3/2001 |
| CN | 2825995 | 10/2006 |
| CN | 101076929 A | 11/2007 |
| DE | 31 20 007 | 12/1982 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| DE | 102010004851 | 6/2011 |
| DE | 102011006597 A1 | 3/2012 |
| DE | 102012021842 B4 | 9/2014 |
| EP | 0216027 A1 | 4/1987 |
| EP | 0 675 272 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 | 12/2002 |
| EP | 1556592 | 10/2003 |

(56) References Cited

FOREIGN PATENT DOCUMENTS

| | | |
|---|---|---|
| EP | 1556932 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 | 4/2004 |
| GB | 588074 | 5/1947 |
| JP | 50077738 | 6/1975 |
| JP | S5252013 | 4/1977 |
| JP | 57-018283 | 1/1982 |
| JP | 58162719 | 9/1983 |
| JP | H02148588 | 12/1990 |
| JP | 03-011575 | 1/1992 |
| JP | 4133281 | 5/1992 |
| JP | 4262388 | 9/1992 |
| JP | 08-260970 | 10/1996 |
| JP | 09166024 | 6/1997 |
| JP | 2008-504649 | 2/2006 |
| JP | 2011222205 A | 11/2011 |
| KR | 20140117152 A | 10/2014 |
| RU | 2116474 | 7/1998 |
| SU | 968493 | 10/1982 |
| SU | 1370269 | 1/1988 |
| WO | WO 87/07777 | 12/1987 |
| WO | WO 91/06142 | 5/1991 |
| WO | WO 92/02718 | 2/1992 |
| WO | WO 2004/036013 | 4/2004 |
| WO | WO 2004/036709 | 4/2004 |
| WO | WO 2004/107518 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |
| WO | WO 2011/031136 | 3/2011 |
| WO | WO 2011/085853 | 7/2011 |
| WO | WO 2011/101541 | 8/2011 |
| WO | WO 2011/128190 | 10/2011 |
| WO | WO 2011/151035 | 12/2011 |
| WO | WO 2012/21914 A1 | 2/2012 |
| WO | WO 2012/091739 | 7/2012 |
| WO | WO2014/201030 | 12/2014 |
| WO | WO2015138987 A1 | 9/2015 |

OTHER PUBLICATIONS

Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.

McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.

Dale, J.D. et al., "Enhanced Ignition for I. C. Engines With Premixed Charge," Lawrence Berkeley Laboratory, Society of Automotive Engineers Annual Congress, Oct. 1980, 52 pages.

"New Spark Plug Concepts for Modern-Day Gasoline Engines," Beru Aktiengesellschaft, MTZ vol. 68, Feb. 2007, 8 pages.

BorgWarner BERU Systems Pre-Chamber Technology, 1 page.

BorgWarner BERU Systems, BERU Industrial Spark Plugs, Feb. 2012, 48 pages.

Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.

Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.

Jessica Adair et al; Knock Characterization Using Ionization Detection; GMRC Gas Machinery Conference; Oklahoma City, Oklahoma; Oct. 2006; pp. 1-23.

Hironori Osamura, Development of Long Life and High Ignitability iridium Spark Plug, Technical Paper, Seoul 2000 FISTITA World Automotive Congress; Jun. 12-15, 2000 Seoul, Korea; 6 pages.

Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.

"Wartsila 34SG Engine Technology for Compressor Drive," Wartsila Engines, Wartsila Corporation 2009, 16 pages.

Federal Mogul, Champion® Bridge Iridium Spark Plug, Industrial Gas Stationary Engines—High Demand/Premium Market, Jun. 2012, 1 page.

Bosch, Spark Plugs Technical Information, published on or before Nov. 28, 2014, 28 pages.

Chiera et al., "Cap Shielded Ignition System", U.S. Appl. No. 14/664,431, filed Mar. 20, 2015, 22 pages.

PCT International Search Report and Written Opinion of the International Searching Authority, PCT/US2016/023272, dated Jun. 16, 2016, 11 pages.

International Preliminary Report on Patentability issued in International Application No. PCT/US2016/023272 dated Jul. 4, 2017; 13 pages.

* cited by examiner

PARALLEL PRECHAMBER IGNITION SYSTEM

CROSS-REFERENCE TO RELATED APPLICATIONS

This application claims the benefit of priority to U.S. Provisional Application Ser. No. 62/136,171, filed on Mar. 20, 2015, the contents of which are hereby incorporated by reference.

BACKGROUND

Engines operating on gaseous fuels, such as natural gas, are commonly operated on a lean air/fuel mixture to reduce generation of pollutants such as nitrous oxides (NOx). A lean air/fuel mixture is a mixture of air and fuel containing excess air beyond that which is stoichiometric for combustion. Often, industrial gas engines are operated at an air-fuel equivalence ratio, $\lambda$ (lambda), of 1.85 or higher, where 1.0 is equal to stoichiometric. However, as the air/fuel mixture gets leaner, the speed at which the flame propagates through the mixture is slowed and the viability of the flame kernel is challenged. This can lead to lean misfire when the flame kernel is not robust enough to advance the flame front quickly, which can lead to very slow onset of combustion or complete misfire.

Passive prechamber igniters are often used to improve ignition. A prechamber igniter has an enclosure defining a prechamber over a spark plug, with no feed of fuel into the prechamber. However, often the air/fuel ratio in the prechamber becomes so lean that the adiabatic flame temperature cannot support the flame kernel, resulting in misfire in the prechamber or quenching of flame exiting the prechamber. The quenching phenomena, called sonic quenching, results when the prechamber pressure is high enough to cause sonic or near sonic flow of the flame out through the nozzles of the prechamber. The prechamber geometry can further exacerbate the problem by bulk quenching the flame temperature in the nozzles. The end result of the quenching is a potential misfire in the main combustion chamber.

BRIEF DESCRIPTION OF THE DRAWINGS

Like reference symbols in the various drawings indicate like elements.

DETAILED DESCRIPTION

The concepts herein relate to igniting an air/fuel mixture in a combustion chamber of an engine using an igniter with a passive, dual prechamber where the chambers operate in parallel.

Figure 1:
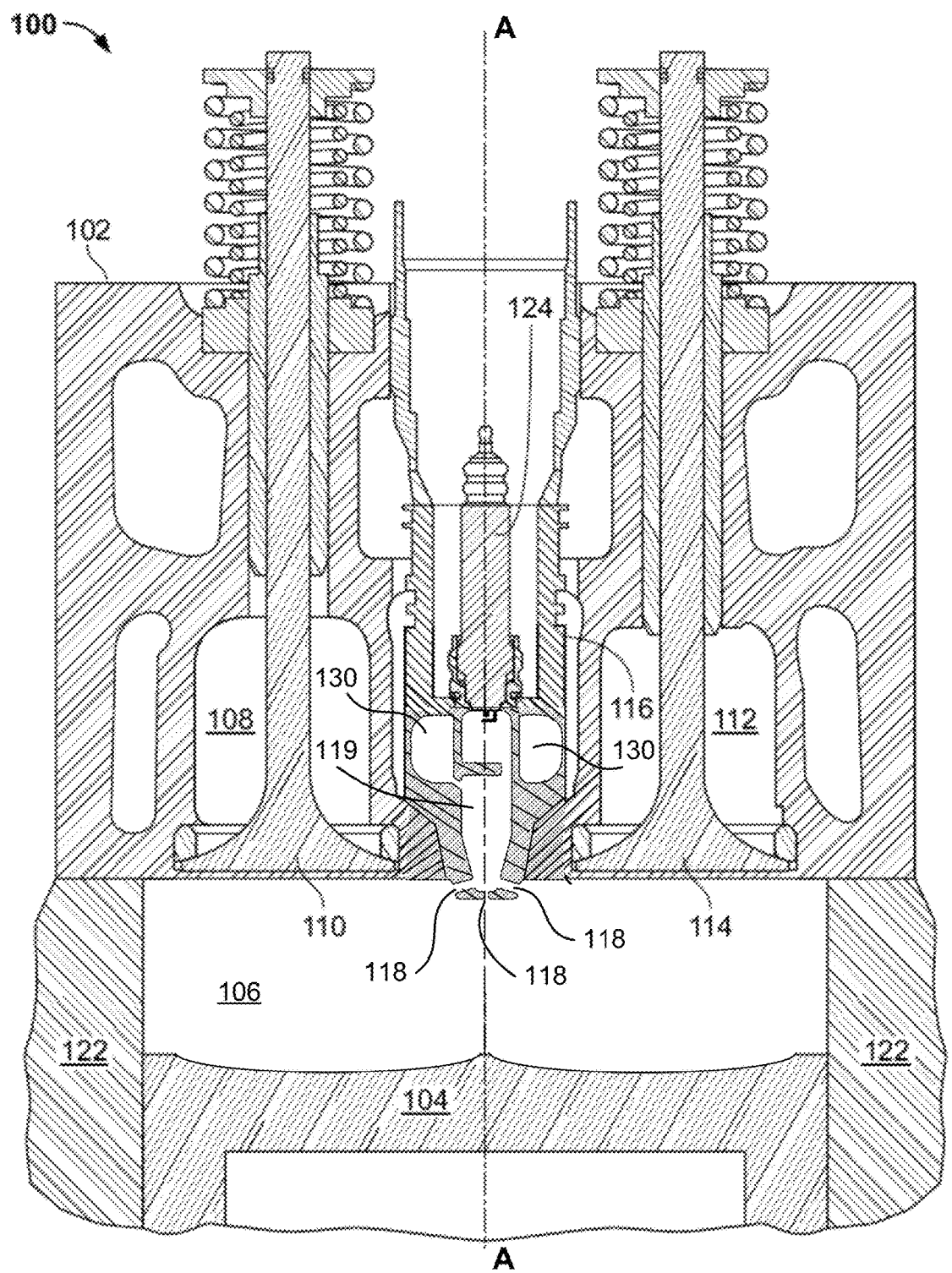
FIG. 1 is a side cross-sectional view of a portion of an example engine including an ignition system using a parallel prechamber.

FIG. 1 shows a cross-section of a portion of an example internal combustion engine 100. The example internal combustion engine 100 is a reciprocating engine and includes a head 102, a block 122, and a piston 104. The piston 104 is located inside a cylinder inside the block 122. A main combustion chamber 106 is the volume located inside the cylinder between the head 102 and the piston 104, and is bounded by the block 122. The piston 104 is arranged to reciprocate axially inside the cylinder during engine operation, compressing air/fuel mixture in the main combustion chamber 106 on an upstroke and driven downward by expansion of combusting air/fuel mixture to produce work. FIG. 1 shows a cross-section of single piston 104 and combustion chamber 106, but the internal combustion engine 100 may have multiple pistons 104 and combustion chamber 106 with associated components.

The example internal combustion engine 100 includes an intake passage 108 with intake valve 110 and an exhaust passage 112 with exhaust valve 114. The passages 108, 112 are in the head 102 adjacent to the combustion chamber 106, and the valves 110, 114 are operable to selectively seal to the walls of the combustion chamber 106, controlling flow with the passages 108, 112. During engine operation, the intake valve 110 opens to let a fresh charge of air/fuel mixture flow from the intake passage 108 into the combustion chamber 106. In other instances, the intake valve 110 admits only air and an in-combustion chamber fuel injector admits fuel to form the air/fuel mixture in the combustion chamber 106. After combustion, the exhaust valve 114 opens to exhaust combustion residuals out of the combustion chamber 106 and into the exhaust passage 112. Although the concepts herein are described with respect to a reciprocating internal combustion engine, the concepts could be applied to other internal combustion engine configurations.

The example internal combustion engine 100 includes an example carrier 116 and an igniter plug 124. The carrier 116 is located in the head 102 and is threadingly and/or otherwise coupled to the head 102. In some instances, the carrier 116 can extend into the combustion chamber 106, be flush with a wall of combustion chamber 106, or be recessed from a wall of combustion chamber 106. The example igniter plug 124 is received inside the example carrier 116 and is coupled to the carrier 116 threadingly and/or otherwise. The carrier 116 thus defines an outer enclosure around the igniter plug 124.

The igniter plug 124 is a device configured to initiate a flame kernel to ignite the charge in the combustion chamber 106, such as a spark plug, laser igniter, corona igniter, plasma igniter, heated surface igniter, nano-pilot fuel igniter, and/or other type of igniter. The igniter plug 124 resides generally around a center longitudinal axis A-A. The example igniter plug 124 includes a first ignition body and a second ignition body adjacent the first ignition body to define a flame kernel initiation gap where the air/fuel mixture within the igniter plug 124 is initially ignited to form the initial flame kernel. In the context of a spark plug, the first ignition body and second ignition body are electrodes and the flame initiation gap is the spark gap, across which an electrical spark arcs. In some cases, the first ignition body and second ignition body are centered about the center longitudinal axis. The ignition bodies can be in a J-gap configuration (e.g., having a J-shaped ignition body positioned over a center positioned ignition body), a tubular configuration (e.g., having a tubular ignition body concentrically receiving a center positioned ignition body), or another configuration. In some cases, the igniter plug 124 has its own prechamber, thus including a cap or enclosure around the ignition bodies that protects the region around the ignition bodies from impinging flow.

The example igniter plug 124 and carrier 116 of FIG. 1 act as a "prechamber" type igniter in that they define an antechamber 119 that encloses the location of flame kernel initiation (i.e., the first and second ignition bodies and the flame kernel initiation gap). The antechamber 119 is an enclosed chamber or space defined by the walls of the carrier 116, inside the carrier 116. The antechamber 119 is adjacent to but separate from the main combustion chamber 106. The outer antechamber 119 resides about an end of the igniter plug 124. The antechamber 119 is shown having a symmetrical shape about the center longitudinal axis of the carrier 116 and igniter plug 124, but in other instances it could be an asymmetrical shape. In some cases, the antechamber 119 is a single chamber, and in some cases, the antechamber 119 includes two or more sub-chambers (as shown in FIG. 1). The carrier 116 also defines a parallel prechamber 130 adjacent to the antechamber 119. The parallel prechamber 130 is fluidly connected to the antechamber 119 by a passage, to receive air/fuel mixture from the antechamber 119. As will described in more detail below, the parallel prechamber 130 is referred to as "parallel" because combustion occurs in the parallel prechamber 130 concurrently, i.e., in parallel, with combustion in the antechamber 119. In FIG. 1, the parallel prechamber 130 is annular and positioned around the exterior of the antechamber 119, but in other instances, the parallel prechamber 130 could be otherwise configured. The parallel prechamber 130 is configured to generate turbulent jet of combusting air/fuel that flows into the antechamber 119, and subsequently into the main combustion chamber of an engine despite being supplied with a lean air/fuel mixture. In some instances, the antechamber 119, the parallel prechamber 130 or both can be defined in the head 102 itself and, if neither is in the carrier 116, the carrier 116 can be omitted. In other instances, rather than being in a separate carrier 116, the antechamber 119, the parallel prechamber 130 or both can be integrated with the igniter plug 124 (e.g., in a common or conjoined housing or enclosure). Again, if both the antechamber 119 and parallel prechamber 130 are integrated with the igniter plug 124, the carrier 116 can be omitted.

The example carrier 116 includes one or a plurality of nozzles, jet apertures 118, oriented in diverging directions and that connect the antechamber 119 to the main combustion chamber 106. The jet apertures 118 extend through the wall of the carrier 116, having internal open ends in the antechamber 119 and external open ends at the exterior of the carrier 116, nominally located inside the combustion chamber 106. The jet apertures 118 can be in a symmetric or asymmetric pattern. In some cases, at least one of the jet apertures 118 is parallel (precisely or substantially) to the center longitudinal axis A-A or perpendicular (precisely or substantially) to the center longitudinal axis A-A. In some cases, one of the jet apertures 118 coincides with the center longitudinal axis, and is oriented aligned with the center longitudinal axis A-A. In some cases, at least one of the jet apertures 118 is not parallel or perpendicular to the center longitudinal axis A-A. The jet apertures 118 allow charge, flame, and residuals to flow between the antechamber 119 and the main combustion chamber 106. The jet apertures 118 operate as jet passages to nozzle combusting air/fuel mixture from the antechamber 119 into divergent flame jets that reach into the combustion chamber 106 and ignite the charge in the combustion chamber 106. The jet apertures 118 also direct fresh air/fuel mixture from the combustion chamber 106 into the antechamber 119.

Figure 2:
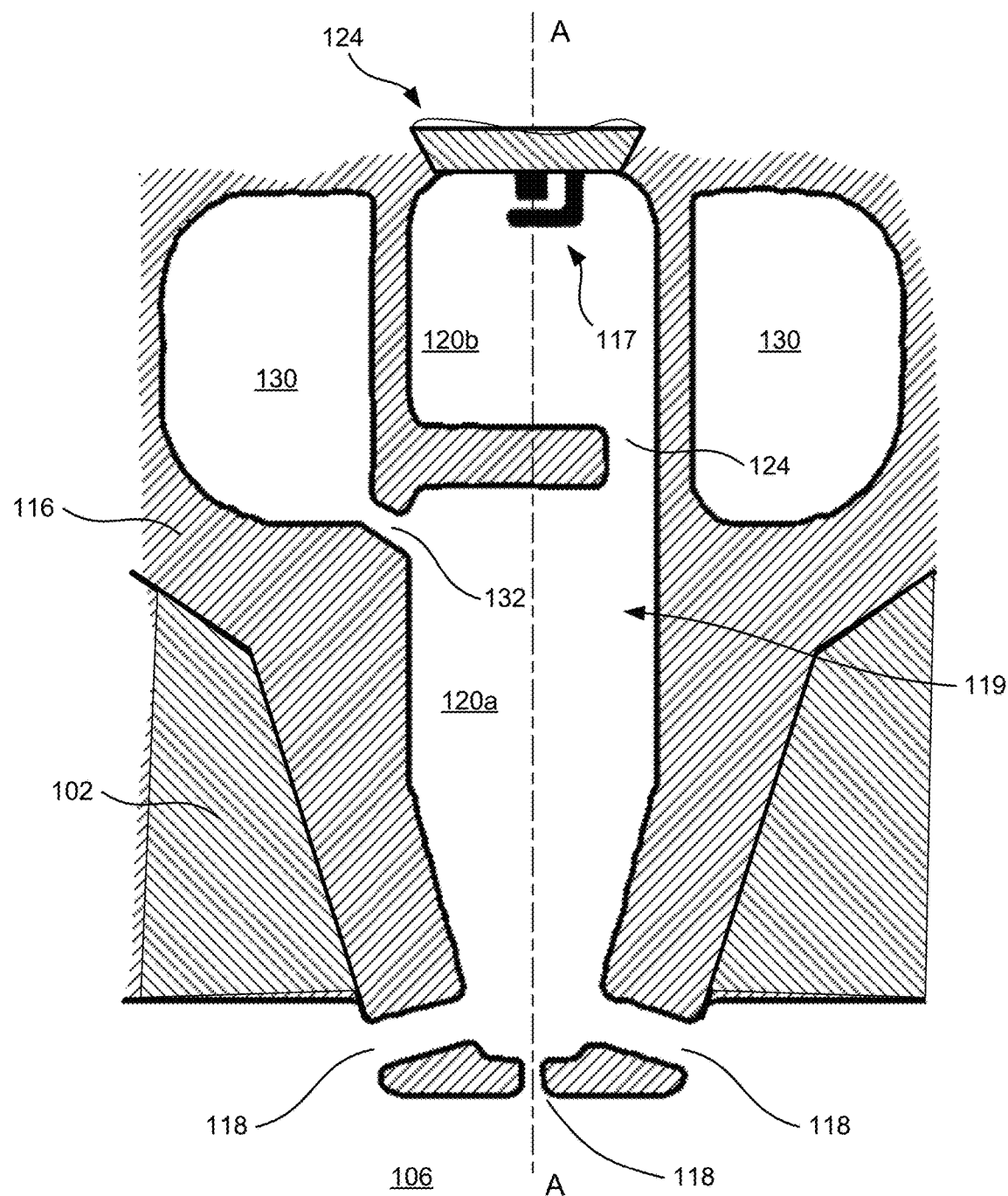
FIG. 2 is a detail, side, half cross-sectional view of a portion of the example ignition system using a parallel prechamber.

FIG. 2 illustrates a detail cross-sectional view of a portion of the example igniter plug 124 received within the carrier 116 and used in an internal combustion engine such as engine 100. The carrier 116 defines the antechamber 119 to include an inner chamber 120*b* separated from an outer chamber 120*a*. The inner chamber 120*b* encloses the ignition bodies 117 of the igniter 124 and can provide a relatively quiescent location that protects the flame kernel from turbulence (e.g., from the main combustion chamber 106) and allows healthier flame kernel growth. The outer chamber 120*a* is fluidly connected to the inner chamber 120 with a passage 124 and to the parallel prechamber 130 with a passage 132. The passages 132 and 124 allow charge, flame and residuals to flow between the inner chamber 120*b* and outer chamber 120*a* (via passage 124) and between parallel prechamber 130 (via passage 132), and operate as nozzles to jet the flow of mixture out of the respective inner chamber 120*b* and parallel prechamber 130. The outer chamber 120*a* is also fluidly connected to the main combustion chamber 106 of the internal combustion engine via one or more jet apertures 118. The jet apertures 118 allow charge, flame, and residuals to flow between the outer chamber 120*a* and the combustion chamber 106, and operate as nozzles to jet the flow of combusting mixture out of the antechamber 119. The jet apertures 118 and outer chamber 120*a* also direct fresh air/fuel mixture from the combustion chamber 106 toward the inner chamber 120*b*. In some cases, the outer chamber 120*a* is elongate and cylindrical, including a somewhat converging nozzle portion (converging toward the end having jet apertures 118) to increase the velocity of the flow to and out of the jet apertures 118. In some cases, the inner chamber 120*b* can include a glow plug, and/or another source of heat (e.g., a source of fuel that will readily ignite) to facilitate initiation combustion in the inner chamber 120*b*.

The carrier 116 also defines the parallel prechamber 130 adjacent to and encircling the antechamber 119. The parallel prechamber 130 is a passively fueled chamber, in that it does not have a separate supply of fuel, except that received from the main combustion chamber 106. In the shown embodiment, the antechamber 119 is likewise passively fueled with no separate supply of fuel. The example parallel prechamber 130 is annular and extends circumferentially around the antechamber 119 and axially coinciding with a center longitudinal axis of the igniter 124. In other implementations, the parallel prechamber 130 does not fully encircle the antechamber 119. In some cases, a parallel prechamber can have a different volume, cross-section, position, and/or size than that shown for example parallel prechamber 130 in FIG. 2. For example, different implementations can use parallel prechambers of different volumes or shapes for specific applications. In some cases, the parallel prechamber 130 can be shaped to enhance turbulence and/or swirl within itself, for example, by having walls shaped to direct internal flow into an internal circulation within the parallel prechamber 130. In some cases, the parallel prechamber 130 is connected to the antechamber 119 via multiple passages 132. In some cases, the parallel prechamber 130 is connected to the inner chamber 120*b* or to both the inner chamber 120*b* and the outer chamber 120*a*. The multiple passages can have different shapes, orientations, or connect to the parallel prechamber 130 and/or the antechamber 119 at different longitudinal positions. In some cases, more than one parallel prechamber 130 is connected to the antechamber 119.

FIGS. 3A-3D illustrate a portion of the example engine 100 during an example ignition process. The engine 100 includes an ignition system 102 including a parallel prechamber 130.

Figure 3A:
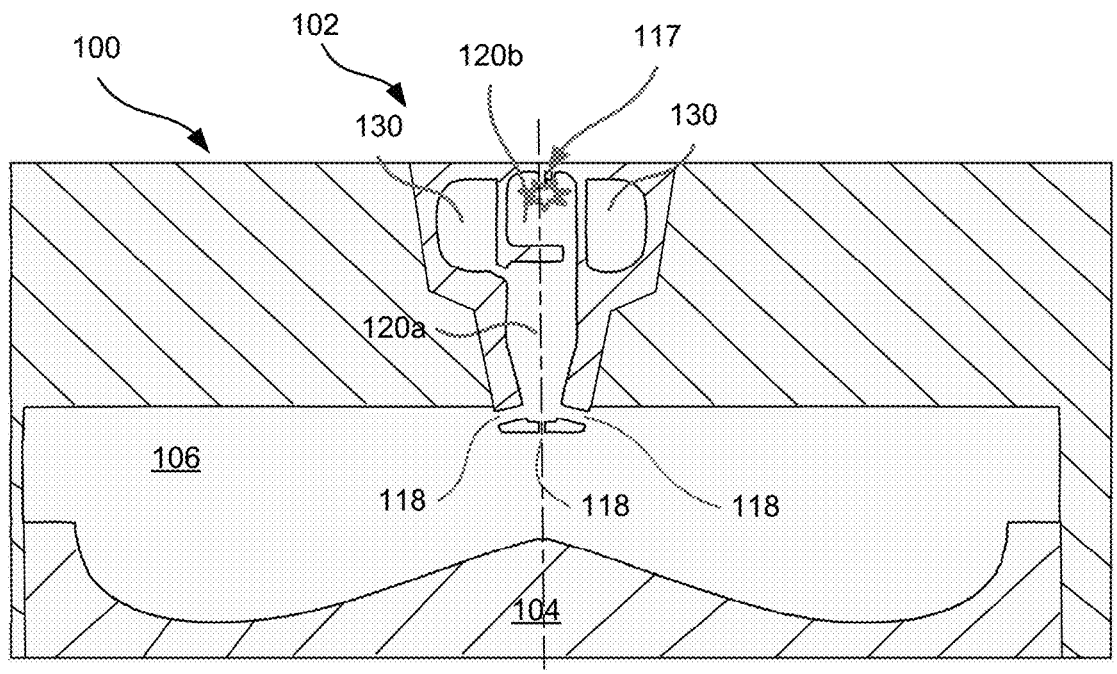
FIGS. 3A-D are detail, side, half cross-sectional views of a piston and cylinder with the example ignition system illustrating a simulated ignition process.

In operation of the engine 100, air and fuel or an air/fuel mixture is introduced into the main combustion chamber 106, for example, through the intake passage (e.g., intake passage 108) and/or through the intake passage and an cylinder fuel injector. The compression action of the piston 104 forces a portion of the cool (relative to residual combustion gasses), fresh air/fuel mixture to flow from the main combustion chamber 106 into the outer chamber 120a through the jet apertures 118. The air/fuel mixture is ingested from the outer chamber 120a into the inner chamber 120b and the parallel prechamber 130. Then, the ignition bodies 117 ignite the mixture (e.g., via a spark or in another manner) in the flame kernel initiation gap, as shown in FIG. 3A, and generate the initial flame kernel.

Figure 3B:
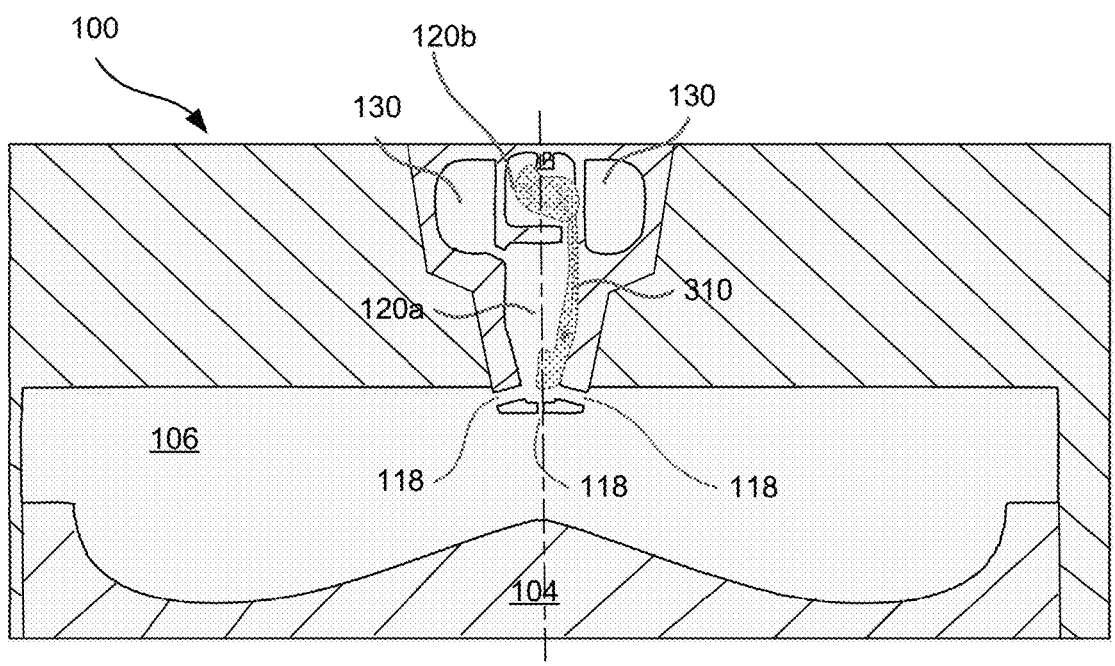

As shown in FIG. 3B, this initial flame propagates through the mixture in the inner chamber 120a. Rising pressure from combustion in the inner chamber 120b drives the growing flame into outer chamber 120a as shown by flow arrow 310. The passage 124 (FIG. 2) nozzles the flame, tending to jet it deep into the outer chamber 120a. Then, the air/fuel mixture in the outer chamber 120a is ignited by the flame received from the inner chamber 120b serially after the air/fuel mixture in the inner chamber 120b, and the flame propagates through the outer chamber 120a. The air/fuel mixture in the parallel prechamber 130 is separated from the outer chamber 120a and is not yet ignited by the flame. Rising pressure from flame growth in the outer chamber 120a drives the flame from out of outer chamber 120a into main combustion chamber 106 through the jet apertures 118 as initial flame jets 314, shown in FIG. 3C. The growing flame jets through the jet apertures 118 and into the combustion chamber 106 exiting at a relatively low pressure differential to the main combustion chamber 106, subsonic, so bulk sonic quenching can be minimized. As such, these initial flame jets 314 extend a relatively short distance into the main combustion chamber 106, and the initial flame jets 314 generate a relatively slowly growing flame front in the main chamber 106 concentrated around the tip of the jet apertures 118. The volumes of the antechamber 119 (i.e., outer chamber 120b and/or inner chamber 120a) and sizes of the jet apertures 118 can be configured (e.g., iteratively via computational simulation methods, and verified with physical testing) to facilitate the relatively low pressure differential between the flaming jets and main combustion chamber 106 to reduce bulk sonic quenching.

Figure 3C:
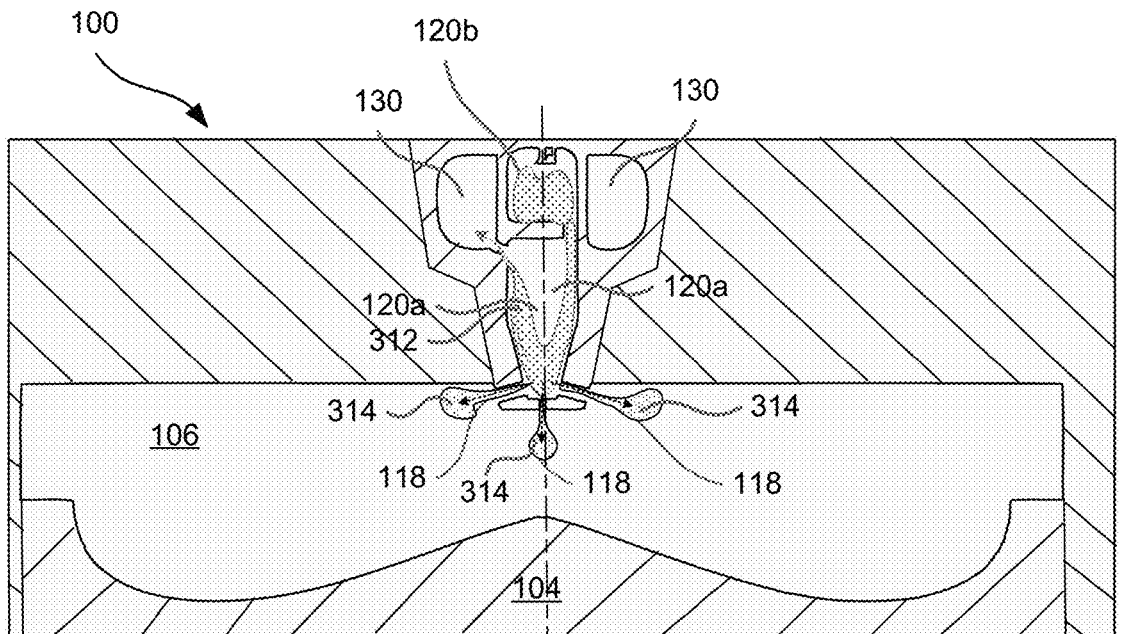

As the combustion in the outer chamber 120a creates initial flame jets 314 into the main combustion chamber 106, turbulence in the outer chamber 120a can allow the flame to grow and the pressure in the outer chamber 120a can cause a portion of the flame to backflow into the parallel prechamber 130 through passage 132 (FIG. 2). This is shown in FIG. 3C with flow arrow 312 indicating a flow of flame from the outer chamber 120a into the parallel prechamber 130. The air/fuel mixture in the parallel prechamber 130 is ignited by the entering flame. This ignition within the parallel prechamber 130 can occur currently with the flames from the initial combustion jetting into the main combustion chamber 106. In this manner, the air/fuel mixture in the parallel prechamber 130 is ignited temporally in parallel with ignition of the air/fuel mixture in the main combustion chamber 106. In some cases, the ignition within the parallel prechamber 130 can initiate shortly before or shortly after the ignition within the main combustion chamber 106.

Figure 3D:
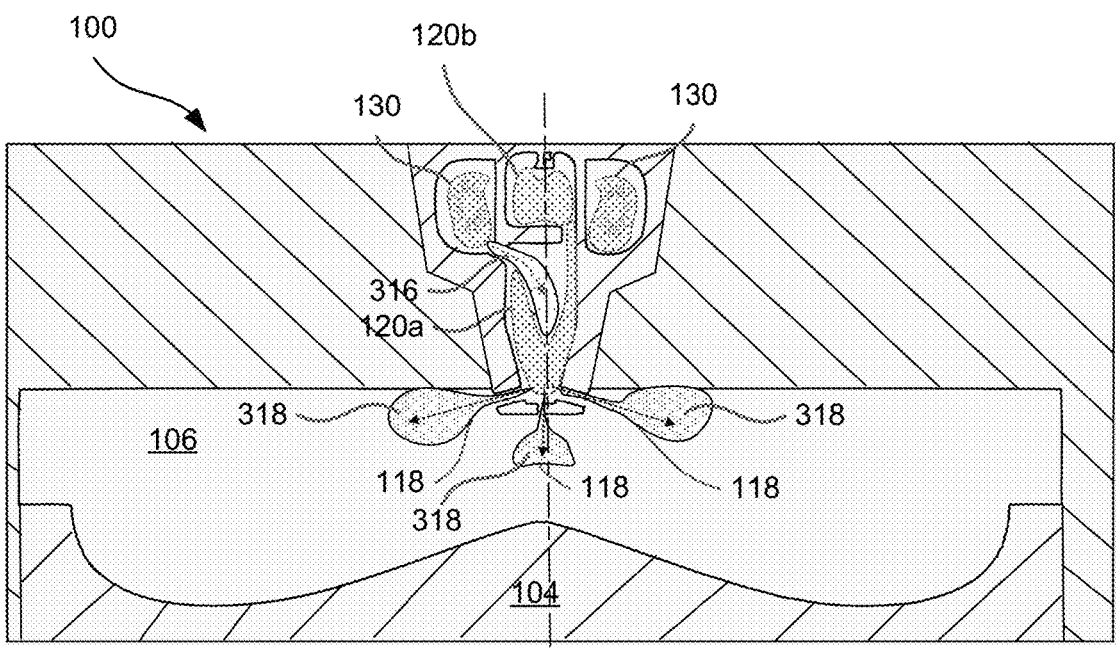

As shown in FIG. 3D, the combustion in the parallel prechamber 130 increases pressure within the parallel prechamber 130, until the pressure gets high enough to jet flames into the outer chamber 120a and then, together with pressure building in the outer chamber 120a, into the main combustion chamber 106. The flame is jetted via the jet apertures 118 with a relatively high velocity and pressure as compared to the initial jets produced only by the initial combustion in the outer chamber 120a. This second high velocity flame join the initial slow flame (flames 314 in FIG. 3C), collectively shown as flames 318 in FIG. 3D, in the main combustion chamber 106 and amplifies the slow flame 314 with a high velocity jet to generate turbulence, achieve turbulent jet combustion, and amplify the flame propagation in the main combustion chamber 106. The amplified jets 318 from the parallel prechamber combustion 130 can reach more deeply into the main combustion chamber 106 than the initial jets (flames 314 in FIG. 3C) and facilitate more rapid and complete combustion within the main combustion chamber 106. Moreover, the amplified jets 318 are more robust and suffer less from sonic quenching, despite exiting the jet apertures 118 with greater speed and at a greater pressure differential than the initial jets. As some combustion is already present in the main combustion chamber 106 from initial jets 314, amplified jets 318 from the parallel prechamber 130 combustion can accelerate main combustion chamber 106 combustion and increase stability in the main combustion chamber 106.

In some cases, parallel prechamber 130 combustion can reach peak pressure and eject high velocity jets 318 in the main combustion chamber 106 when the combustion in main combustion chamber 106 is already developed and healthy. The combustion in the main combustion chamber 106 can be configured to start according to a pressure within the parallel prechamber 130. In some cases, the combustion in the main combustion chamber 106 can be configured to start before a pressure in the parallel prechamber 130 is greater than a pressure in the main combustion chamber 106. In some cases, the combustion in the main combustion chamber 106 can be configured to start when a pressure in the parallel prechamber 130 is greater than a pressure in the main combustion chamber 106. In some cases, the combustion starts in the inner chamber 120b and the flame kernel develops and enters the parallel prechamber 130 via a passage from the inner chamber 120b. As the initial flame jets 314 do not have to be solely used to start combustion in main combustion chamber 106, the quenching effect is reduced. By using a parallel prechamber 130, a leaner air/fuel mixture can be used and NOx can be reduced while maintaining good combustion quality.

Accordingly, certain aspects encompass a system for igniting a mixture in an internal combustion engine. The system includes an elongate plug body generally residing around a center longitudinal axis and adapted to couple to the internal combustion engine. A first ignition body resides about an end of the plug body. A second ignition body is adjacent the first ignition body to define a flame kernel initiation gap between the second ignition body and the first ignition body. The system includes an enclosure defining a first chamber enclosing the first and second ignition bodies and defining a second chamber adjacent the first chamber and connected to the first chamber via a passage. The enclosure includes a plurality of jet apertures between the interior of the first chamber and the exterior of the enclosure.

Certain aspects encompass a method of igniting an air/fuel mixture in an internal combustion engine where the air/fuel mixture is received as an incoming air/fuel mixture flow from a main combustion chamber of the internal combustion engine into an enclosure adjacent the main combustion chamber. The enclosure defines a first chamber enclosing first and second ignition bodies and the enclosure defines a second chamber adjacent the first chamber and connected to the first chamber via a passage. A portion of the air/fuel mixture received in the enclosure is directed toward an ignition gap between the first and second ignition bodies and another portion into the second chamber. The air/fuel mixture in the ignition gap is ignited and flame from combustion in the first chamber is ejected into the main combustion chamber. Then, flame from combustion in the second chamber is ejected into the main combustion chamber.

Certain aspects encompass an internal combustion engine including an ignition plug comprising an igniter and an enclosure receiving the ignition plug. The enclosure defines a first chamber about the end of the igniter and a second chamber adjacent the first chamber and fluidly connected to the first chamber.

The aspects can include some, all or none of the following features. For example, in certain instances the first chamber includes a first inner chamber and a first outer chamber connected by a second passage. The inner chamber encloses the first and second ignition bodies and the outer chamber is connected to the second chamber via the first mentioned passage. In certain instances, the second chamber is annular and extends circumferentially around the first chamber, axially coinciding with the center longitudinal axis. The first chamber can be a passively fueled chamber having no fuel supply directly into the first chamber. The second chamber can also or alternatively be a passively fueled chamber having no fuel supply directly into the second chamber. In certain instances, the first chamber is elongate and cylindrical, having a converging portion near the plurality of jet aperture. In certain instances, the second chamber is annular and extends around the first chamber. In certain instances, the plurality of jet apertures are oriented in diverging directions. The first and second ignition bodies can be first and second electrodes and flame kernel initiation gap comprises a spark gap. In operation, flame from combustion in the first chamber can be received into the main combustion chamber while receiving flame from combustion in the first chamber into the second chamber and igniting air/fuel mixture in the second chamber. Flame from combustion in the first chamber can be driving into the main combustion chamber and into the second combustion chamber using pressure from combustion in the first combustion chamber. In certain instances, flame from combustion in the first chamber can be ejected into the main combustion chamber concurrently while ejecting flame from combustion in the second chamber into the main combustion chamber. The air/fuel mixture in the first outer chamber can be ignited using combustion ejected into the first outer chamber from the first inner chamber. Air/fuel mixture in the second chamber can be ignited using combustion ejected from the first outer chamber into the second chamber.

A number of examples have been described. Nevertheless, it will be understood that various modifications may be made. Accordingly, other examples are within the scope of the following claims.

We claim:

1. A system for igniting a mixture in an internal combustion engine, the system comprising:
    an elongate plug body generally residing around a center longitudinal axis and adapted to couple to the internal combustion engine;
    a first ignition body residing about an end of the plug body;
    a second ignition body adjacent the first ignition body to define a flame kernel initiation gap between the second ignition body and the first ignition body; and
    an enclosure defining a first chamber enclosing the first and second ignition bodies and defining a second chamber adjacent the first chamber and connected to the first chamber via a first passage, the enclosure comprising a plurality of jet apertures between the interior of the first chamber and the exterior of the enclosure, the first chamber comprising a first inner chamber and a first outer chamber connected by a second passage, the inner chamber enclosing the first and second ignition bodies and the outer chamber connected to the second chamber via the first passage.

2. The system of claim 1, where the second chamber is annular and extends circumferentially around the first chamber, axially coinciding with the center longitudinal axis.

3. The system of claim 1, where the first chamber is a passively fueled chamber having no fuel supply directly into the first chamber.

4. The system of claim 3, where the second chamber is a passively fueled chamber having no fuel supply directly into the second chamber.

5. The system of claim 1, where the first chamber is elongate and cylindrical, having a converging portion near the plurality of jet aperture.

6. The system of claim 5 where the second chamber is annular and extends around the first chamber.

7. The system of claim 1, where the plurality of jet apertures are oriented in diverging directions.

8. The system of claim 1, where the first and second ignition bodies comprise first and second electrodes and flame kernel initiation gap comprises a spark gap.

9. A method of igniting an air/fuel mixture in an internal combustion engine, the method comprising:
    receiving the air/fuel mixture as an incoming air/fuel mixture flow from a main combustion chamber of the internal combustion engine into an enclosure adjacent the main combustion chamber, the enclosure defining a first chamber enclosing first and second ignition bodies and the enclosure defining a second chamber adjacent the first chamber and connected to the first chamber via a first passage, where the enclosure defines the first chamber as comprising a first inner chamber and a first outer chamber connected by a second passage, and where the first inner chamber encloses the first and second ignition bodies;
    directing a portion of the air/fuel mixture received in the enclosure toward an ignition gap between the first and second ignition bodies and another portion into the second chamber;
    igniting the air/fuel mixture in the ignition gap; and
    ejecting flame from combustion in the first chamber into the main combustion chamber; and then
    ejecting flame from combustion in the second chamber into the main combustion chamber.

10. The method of claim 9, where the second chamber is annular and extends circumferentially around the first chamber.

11. The method of claim 9, comprising receiving flame from combustion in the first chamber into the main combustion chamber while receiving flame from combustion in the first chamber into the second chamber and igniting air/fuel mixture in the second chamber.

12. The method of claim 11, comprising driving flame from combustion in the first chamber into the main combustion chamber and into the second combustion chamber using pressure from combustion in the first combustion chamber.

13. The method of claim 9, comprising ejecting flame from combustion in the first chamber into the main combustion chamber concurrently while ejecting flame from combustion in the second chamber into the main combustion chamber.

14. The method of claim 9, where ejecting flame from combustion in the first chamber into the main combustion chamber comprises combusting air/fuel mixture in the first inner chamber, then igniting air/fuel mixture in the first outer chamber using combustion ejected into the first outer chamber from the first inner chamber.

15. The method of claim 14, where ejecting flame from combustion in the second chamber into the main combustion chamber comprises igniting air/fuel mixture in the second chamber using combustion ejected from the first outer chamber into the second chamber.

16. The method of claim 14, where combusting air/fuel mixture in the first chamber ignites uncombusted air/fuel mixture in the second chamber.

17. An internal combustion engine, comprising:
an ignition plug comprising an igniter;
an enclosure receiving the ignition plug, the enclosure defining a first chamber about the end of the igniter and defining a second chamber adjacent the first chamber and fluidly connected to the first chamber, the first chamber comprising a first inner chamber and a first outer chamber connected by a passage, the inner chamber enclosing the igniter and the outer chamber fluidly connected to the second chamber;
an enclosure defining a first chamber enclosing the first and second ignition bodies and defining a second chamber adjacent the first chamber and connected to the first chamber via a passage.

18. The engine of claim 17, where the second chamber is annular and extends circumferentially around the first chamber.

* * * * *

UNITED STATES PATENT AND TRADEMARK OFFICE
CERTIFICATE OF CORRECTION

PATENT NO. : 9,840,963 B2
APPLICATION NO. : 15/074937
DATED : December 12, 2017
INVENTOR(S) : Domenico Chiera and Gregory James Hampson Page 1 of 1

It is certified that error appears in the above-identified patent and that said Letters Patent is hereby corrected as shown below:

On the Title Page

Under Attorney, Agent or Firm, please replace "Richarson" with -- Richardson --

Item (56) Other Publications: on page 4, Column 2, Line 31, please replace "FISTITA" with -- FISITA --

Signed and Sealed this
Third Day of April, 2018

Andrei Iancu
*Director of the United States Patent and Trademark Office*